Dec. 26, 1939. H. C. BOWEN 2,185,072
FLUID PRESSURE PRODUCING DEVICE
Filed Jan. 22, 1937
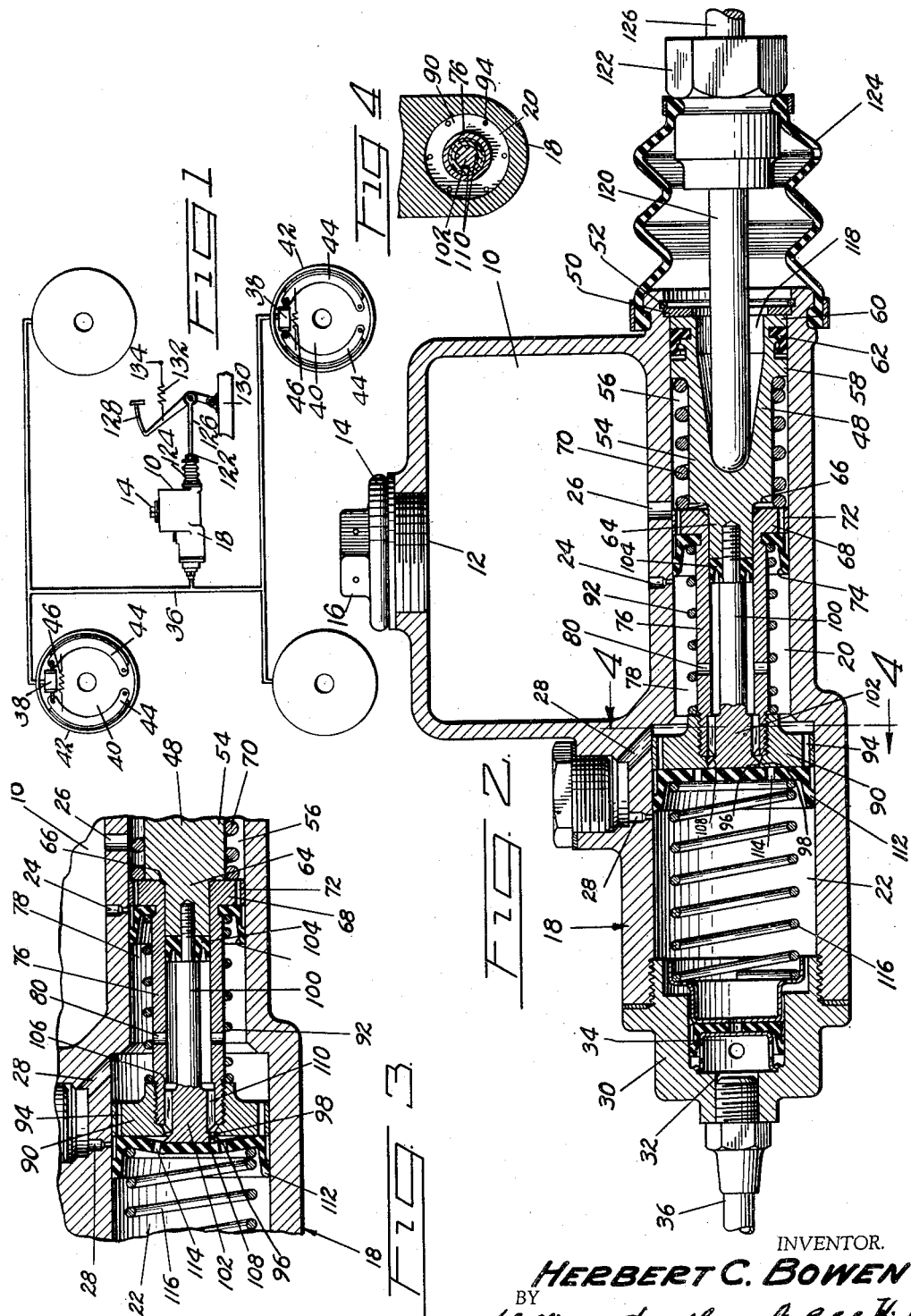
INVENTOR.
HERBERT C. BOWEN
BY
Williams, Bradbury, McCaleb & Hinkle
ATTORNEYS.

Patented Dec. 26, 1939

2,185,072

UNITED STATES PATENT OFFICE 2,185,072

FLUID PRESSURE PRODUCING DEVICE

Herbert C. Bowen, Detroit, Mich., assignor to Hydraulic Brake Company, Detroit, Mich., a corporation of California Application January 22, 1937, Serial No. 121,766

9 Claims. (Cl. 60—54.6)

This invention relates to hydraulic brake systems, and more particularly to fluid pressure producing devices for such systems.

Broadly the invention comprehends a fluid pressure braking system including a pressure producing device operative to compound the pressure in the system without proportionately greater effort on the part of the operator, and to so compound the pressure as to smooth out the operation of the system.

An object of the invention is to provide a fluid pressure producing device operative to compound pressure in increments so that the transition from relatively low pressure to high pressure may be accomplished without shock.

Another object of the invention is to provide a fluid pressure producing device operative to automatically effect a gradual transition from a low pressure to a high pressure without perceptible increase in the applied operating force.

Other objects of the invention will appear from the following description taken in connection with the drawing forming a part of this specification, and in which:—

Fig. 1 is a schematic view illustrating a hydraulic braking system embodying the invention;

Fig. 2 is a vertical, sectional view of the fluid pressure producing device illustrating the piston thereof in retracted position;

Fig. 3 is a fragmentary view illustrating the piston of the fluid pressure producing device on its compression stroke; and Fig. 4 is a sectional view substantially on line 4—4, Fig. 2.

Referring to the drawing, 10 represents a reservoir having a filling opening 12 which may be closed as by a conventional plug 14 provided with suitable ducts 16 for venting the reservoir to the atmosphere. Formed at the base of the reservoir is a cylinder 18 including a small chamber 20, immediately beneath the reservoir, and a large chamber 22 concentric to and in communication with the small chamber and extending beyond the reservoir. The small chamber 20 has spaced ports 24 and 26 providing communications between the small chamber and the reservoir, and the large chamber has a by-pass 28 in its wall and is closed at its outer end as by a head 30 having a discharge port 32 controlled by a two-way valve 34, the purpose of which will hereinafter appear.

A fluid pressure delivery pipe system 36 connects the discharge port 32 in the head of the cylinder to fluid pressure actuated motors 38 arranged for actuating the friction elements of brakes associated with the wheels of a motor vehicle. The brakes may be of conventional type, each including a fixed support or backing plate 40, a rotatable drum 42 associated with the backing plate, a pair of corresponding oppositely disposed friction elements or shoes 44 arranged on the backing plate for cooperation with the drum, and a motor corresponding to the motors 38 for spreading the friction elements into engagement with the drum 42 against the resistance of a retractile spring 46 connected between the frictional elements.

A piston 48 reciprocable in the cylinder 18 is held against displacement by a washer 50 supported on a retaining ring 52 seated in the circumferential groove in the wall of the cylinder adjacent the open end thereof. The piston includes a short cylindrical section 54 of reduced diameter providing, in conjunction with the wall of the small chamber 20, an annular chamber 56 communicating with the reservoir 10 by way of the port 26. The rear end of the short cylindrical section 54 has thereon spaced flanges 58 and 60 fitting snugly in the small chamber 20, and fitted between these flanges is a leak-proof washer 62 inhibiting the seepage of fluid from the cylinder. The forward end of the short cylindrical section 54 has a concentric extension 64 providing an annular shoulder 66 at its junction with the short cylindrical section 54.

A reciprocable piston head 68 mounted on the extension 64 normally seats on a coil spring 70 interposed between the piston head 68 and the flange 58 on the piston. This piston head 68 has a plurality of spaced passages 72 providing communications between the annular chamber 56 and that portion of the chamber forward of the piston head 68, and a collapsible leakproof cup 74 seated on the piston head 68 controls the passages. The piston head 68 has formed integral therewith a concentric sleeve 76 providing in conjunction with the wall of the chamber 20 an annular chamber 78. The sleeve 76 has a port 80 providing a communication between the annular chamber 78 and the interior of the sleeve; and the annular chamber 78 communicates with the reservoir 10 by way of the port 24, also with the by-pass 28 in the wall of the cylinder. A piston head 90 is attached to the free end of the sleeve, and a light coil spring 92 interposed between the piston head 90 and the collapsible leakproof cup 74 serves to retain the cup against displacement.

The piston head 90 fits snugly in the large chamber 22 of the cylinder, and this head has a plurality of spaced passages 94 therethrough providing communications between the annular chamber 78 and that portion of the chamber 22 forward of the piston 90. The piston head 90 also has a concentric opening 96 registering with the sleeve 76, and the perimeter defining this opening has an overhanging lip 98. A rod 100 attached concentrically to the extension 64 has a head 102 adapted to enter the opening 96. As shown, the rod has sleeved thereon a leak-proof cup 104 inhibiting the passage of fluid between the sleeve 76 and the concentric extension 64 supporting the sleeve.

The head 102 on the rod normally rests on an annular shoulder 106 on the interior of the sleeve 76 with the face of the head in the same plane as the face of the piston head 90, so as to present an unbroken surface, the purpose of which will hereinafter appear. Preferably the head is undercut, as shown at 108, so as to materially reduce the amount of movement required to permit the passage of fluid through the opening 96, and the head is longitudinally slotted at 110 to provide for the passage of fluid past the head into the sleeve 76.

A collapsible leak-proof cup 112 seated on the head 90 controls the passages 94 and the concentric opening 96 in the head 90 of the piston. As shown, the cup has a plurality of spaced openings 114 providing for the passage of fluid therethrough when the cup is distorted due to relative movement between the piston head 90 and the head 102 on the rod 100. A coil spring 116 interposed between the cup 112 and the two-way valve 34 serves to retain these instrumentalities against displacement and also to return the piston to its retracted position.

The piston 48 has on its back a recess 118 for the reception of one end of a thrust pin 120, and the other end of this pin has thereon a coupling 122 connected by a flexible boot 124 to the open end of the cylinder for the exclusion of dust and other foreign substances from the interior of the cylinder. A rod 126 connects the coupling 122 to a foot pedal lever 128 pivotally mounted on a suitable support 130 and connected by a retractile spring 132 to a fixed support 134.

Assuming that the system is filled with liquid or fluid, upon depressing the foot pedal lever 128 force is transmitted from the lever through the rod 126 and the thrust pin 120 to the piston 48, resulting in moving the piston on its compression stroke. During the initial movement of the piston on its compression stroke pressure on the fluid in the large chamber 22 of the cylinder is received by the cup 112 on the head 90 of the piston.

As the piston advances on its compression stroke the cup 112 closes the by-pass 28 and thereafter a portion of the fluid in the large chamber 22 is displaced therefrom past the two-way valve 34, which inhibits retrograde movement of the fluid, through the discharge port 32 and the fluid piping system 36 into the motors 38, causing actuation of these motors. This actuation of the motors results in movement of the friction elements 44 into engagement with the drums 42 against the resistance of their respective retractile springs 46.

During the operation just described a partial vacuum is created in the small chamber 20 forward of the piston 68, resulting in drawing fluid from the reservoir 10 through the port 26 and the passages 72 in the head 68 of the piston and past the cup 74 on the head 68 into that portion of the small chamber 20 forward of the head 68 to completely fill the chamber 20.

When the pressure on the fluid in the large chamber 22 of the cylinder reaches a sufficiently high degree to overcome the load on the spring 70, the heads 68 and 90 of the piston recede and seat on the annular shoulder 66, and when assuming this position the head 102 on the rod 100 normally seated on the annular shoulder 106 takes a position slightly forward of the head 90 of the piston. This results in distorting the cup 112 and thereby establishing communication between the large chamber 22 and the sleeve 72 and also with the annular chamber 78 by way of the port 80. The pressure on the fluid in the chamber 20 is now received on the cup 74 on the head 68 of the piston and the cup 104 on the concentric extension 64.

When the foot pedal is advanced slowly, the pressure in the chamber 20 imposed on the cup 74 is insufficient to overcome the load on the spring 70, and because of this the heads 68 and 90 of the piston are advanced under the influence of the spring 70, resulting in closing the opening 96 in the head 90. The pressure on the fluid in the large chamber 22 of the cylinder is again developed by the cup 112, and when this pressure becomes sufficiently high to overcome the load on the spring 70 the heads 68 and 90 of the piston again recede, resulting as hereinbefore explained in establishing communication between the chamber 22 and the sleeve 76 and the annular chamber 78, and in transfer of the pressure from the chamber 22 wherein it was received by the cup 112 to the chamber 20 wherein the pressure is received by the cups 76 and 104. This action is repeated periodically during the compression stroke of the piston until the pressure on the fluid in the chamber 20 imposed on the cup 74 is sufficient to overcome the load on the spring 70, whereupon the head 90 of the piston becomes ineffective for producing pressure.

After the head 90 of the piston becomes ineffective, the head 68 assumes the entire burden of discharging fluid from the compressor into the line leading to the wheel cylinders and of increasing the pressure on the system to increase the braking action. Because of the relatively small area of the head 68, a high pressure can be created without the exertion of undue manual force.

If the foot pedal is depressed rapidly, as during an emergency application of the brakes, the repeated opening and closing of the passage through the head 90 heretofore described, may not be present. With such rapid advance of the piston the forward movement of the high pressure head 68 may immediately build up sufficient increase in pressure in the high pressure chamber to overcome the load on the spring 70 and thus maintain open the passageway through the head 90 sufficiently to permit slow leakage of fluid through this passageway so that the preponderance of pressure on the head 90 over that on the head 68 is gradually dissipated.

Upon releasing the applied force on the foot pedal lever 128, the lever is returned to its retracted position under the influence of the retractile spring 132. During this movement of the foot pedal lever the piston 48 is moved to its retracted position under the influence of the spring 116, and as the piston moves to its retracted position fluid is returned to the chamber 22 of the cylinder from the fluid pressure actuated motors 38 under the influence of the retractile springs 46 connected between the respective pairs of frictional elements 44.

Due to friction on the fluid in the chamber 22 of the cylinder and the fluid pressure piping system 36 connecting this chamber to the fluid pressure actuated motors 38, and to the tension of the spring 116, the piston returns to its retracted position slightly in advance of the return of the fluid to the chamber 22. This causes a partial vacuum in the chamber 22 resulting in collapse of the cup 112 and the admission of fluid from the chamber 20 of the cylinder to the chamber 22 to completely fill the chamber 22. The movement of fluid from the chamber 20 to the chamber 22 is augmented by a gradual decrease in the capacity of the chamber 20 due to movement of the piston to its retracted position. When the piston has returned to its fully retracted position, any excess fluid in the chamber 22 caused by the return of fluid from the motors 38 and the pipe system 36 passes therefrom through the by-pass 28 to the chamber 20 and thence to the reservoir by way of the compensating port 24.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim is new and desire to secure by Letters Patent is:

1. A fluid pressure producing device comprising a high pressure producing means and a low pressure producing means arranged in tandem with the low pressure producing means forward of the high pressure producing means, said low pressure producing means having a fluid outlet for both of said pressure producing means, and means automatically actuated by pressure in the device for gradually transferring the pressure from one pressure producing means to the other, said last-named means comprising a valve having separate parts exposed to the pressure produced in each pressure-producing means, the part in the low-pressure producing means being at least as large as the part in the high-pressure producing means.

2. A fluid pressure producing device comprising a high pressure producing means and a low pressure producing means arranged in tandem with the low pressure producing means forward of the high pressure producing means, said low pressure producing means having a fluid outlet for both of said pressure producing means, and means automatically actuated by subjecting the fluid in the device to a constantly increasing pressure to gradually transfer the pressure from one pressure producing means to the other pressure producing means in increments, said last-named means comprising a valve having separate parts exposed to the fluid pressures in each pressure producing means, the part exposed to the fluid pressure in the low-pressure producing means being larger than the part exposed to the pressure in the high-pressure producing means.

3. A fluid pressure producing device comprising a high pressure producing means and a low pressure producing means arranged in tandem with the low pressure producing means forward of the high pressure producing means, said low pressure producing means having a fluid outlet for both of said pressure producing means, means for actuating the pressure producing means concomitantly to build up pressure in the low pressure producing means and to maintain a uniform pressure in the high pressure producing means, and means automatically actuated upon building up pressure in the low pressure producing means to gradually transfer the pressure from one pressure producing means to the other pressure producing means by repeatedly building up and relieving the pressure in the low pressure producing means, said last-named means comprising a valve having separate parts exposed to the pressure produced in each pressure-producing means, the part in the low-pressure producing means being at least as large as the part in the high-pressure producing means.

4. A fluid pressure producing device comprising a high pressure producing means and a low pressure producing means arranged in tandem with the low pressure producing means forward of the high pressure producing means, said low pressure producing means having a fluid outlet for both of said pressure producing means, means for actuating the pressure producing means concomitantly to build up pressure in the low pressure producing means and to maintain a uniform pressure in the high pressure producing means, and means automatically actuated by pressure on the fluid in the low pressure producing means to gradually transfer the pressure from the low pressure producing means to the high pressure producing means by alternately building up and relieving pressure on the fluid in the low pressure producing means until the pressure on the fluid in the high pressure producing means renders the low pressure producing means ineffective, said last-named means comprising a valve having separate parts exposed to the fluid pressures in each pressure producing means, the part exposed to the fluid pressure in the low-pressure producing means being larger than the part exposed to the pressure in the high-pressure producing means.

5. In a fluid pressure producing device, a piston having a skirt, a reduced body portion and a concentric extension, a small head reciprocable on the extension, a sleeve on the small head, a large head on the sleeve forward of the small head, and a valve in the large head.

6. In a fluid pressure producing device, a piston comprising a skirt, a reduced body portion and a concentric extension, a small head reciprocable on the extension, a spring interposed between the small head and the skirt, a concentric sleeve on the small head, a large head on the sleeve, and a valve in the large head having its stem attached to the extension.

7. In a fluid pressure producing device, a piston comprising a skirt, a reduced body portion and a concentric extension, a small head reciprocable on the extension, a spring sleeved on the reduced body portion between the small head and the skirt, a concentric sleeve on the small head projecting forward, a large piston on the sleeve, and a valve in the large head having its stem attached to the extension.

8. In a fluid pressure producing device, a piston comprising a skirt, a reduced body portion and a concentric extension, a small head reciprocable on the extension provided with a plurality of spaced passages therethrough, a spring sleeved on the reduced body portion between the small head and the skirt, a collapsible cup on the small head controlling the passages therein, a concentric sleeve on the small head extending forward, a large head on the sleeve having a plurality of spaced passages therethrough and a coaxial opening communicating with the sleeve, a spring sleeved on the sleeve between the large head and the cup on the small head, a member carried on the extension adapted to enter the opening in the large head, and a collapsible cup on the large head controlling the passages in the large head and having in its bottom a plurality of spaced openings for the passage of fluid therethrough.

9. A fluid pressure producing device comprising a reservoir, a cylinder at the base of the reservoir including a small chamber having ports providing communications between the reservoir and the cylinder and a large chamber concentric to and communicating with the small chamber having a by-pass and a discharge port, a piston reciprocable in the small chamber including a skirt, a reduced body portion and a concentric extension, a small head reciprocable on the extension having passages therethrough, a spring interposed between the small head and the skirt, a collapsible cup on the small head controlling the passages therein, a concentric sleeve on the small head extending forward into the large chamber having a port providing a communication between the sleeve and the cylinder, a large head on the sleeve within the large chamber having a plurality of spaced passages therethrough and a concentric opening registering with the sleeve, a member on the extension adapted to open and close the opening in the head, a collapsible cup on the large head having a plurality of spaced openings in its bottom, and a spring interposed between the cup on the large head and the head of the cylinder.

HERBERT C. BOWEN.